May 5, 1925.
F. E. BROWNE
HALF HOSE GARTERS
Filed Dec. 31, 1923
1,536,472
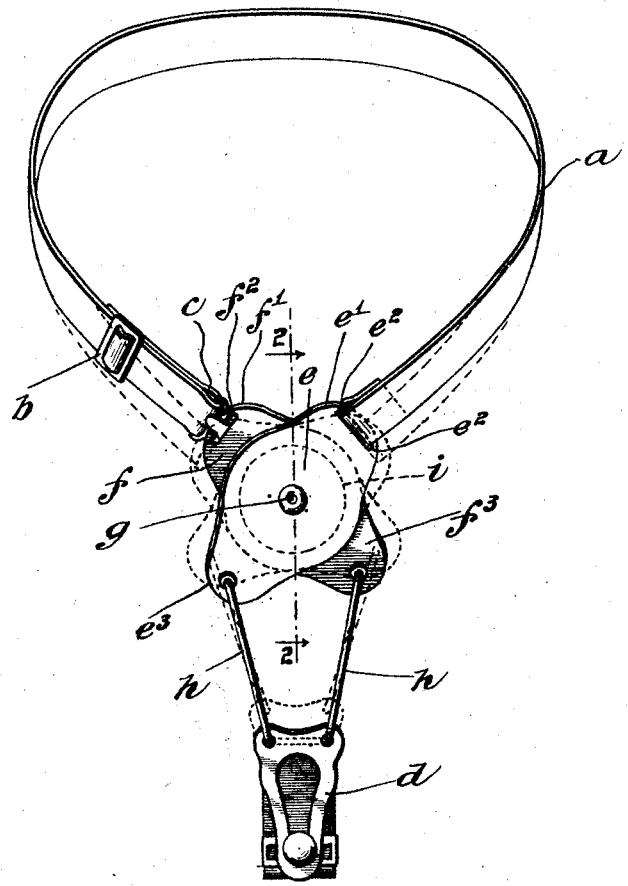

Patented May 5, 1925.

1,536,472

UNITED STATES PATENT OFFICE.

FRELEIGH E. BROWNE, OF RIDGEFIELD PARK, NEW JERSEY.

HALF-HOSE GARTER.

Application filed December 31, 1923. Serial No. 683,555.

*To all whom it may concern:*

Be it known that I, FRELEIGH E. BROWNE, a citizen of the United States, residing at Ridgefield Park, in the county of Bergen and State of New Jersey, have invented certain new and useful Improvements in Half-Hose Garters, of which the following is a specification, reference being had therein to the accompanying drawings, which form a part thereof.

The invention relates to half hose garters and more particularly to a garter or supporter of this type which is so constructed that the desired flexibility may be secured in the article without necessity for using the usual elastic webbing or cords.

In a half hose garter embodying my invention, I employ an ordinary clasp for attachment adjacent the top of the hose and a leg strap of non-elastic material, these parts being so connected that the leg band will be drawn sufficiently tight about the leg to properly support the hose as a result of the stresses upon the clasp developed during and while the garter is being adjusted to the hose and the wearer.

The construction is such that play of the leg muscles of the wearer will cause the enlargement or reduction of the loop or bight of the leg strap, enlargement of this bight applying mechanical stresses to the half hose through the clasp in a manner to cause the immediate shortening of the loop or bight, when conditions are such as to permit the reduction of the bight.

The connecting means between the leg strap and the clasp are so constructed and combined as to ensure the desired freedom of movement of the parts of this mechanism while, at the same time, avoiding any possibility of wear upon the flexible parts of the garter co-operating therewith, thus not only preventing excessive wear of these parts, but also avoiding the objectionable loosening of the leg strap due to the failure of other parts of the garter to properly function.

The invention consists primarily in a half hose garter embodying therein a pair of crossed levers, a pivotal connection between said levers, a leg strap, one end of which is connected with one arm of one of said levers, the other end of which is adapted to be connected with the adjacent arm of the other lever, a clasp adapted to be connected with the half hose to be supported, and flexible connections between said clasp and the other arms of said levers respectively, whereby an enlargement in the bight of said leg strap will develop an upward pull upon said clasp, and the slack resulting from a reduction in the size of said bight will be automatically taken up as a result of the downward pull upon said levers by the half hose through said clasp and said flexible connections; and in such other novel features of construction and combination of parts as are hereinafter set forth and described and more particularly pointed out in the claims hereto appended.

Referring to the drawings,

Fig. 1 is a view of a half hose garter embodying my invention, showing in dotted lines the position of parts upon the enlargements of the bight in the leg strap; and Fig. 2 is a section on the line 2—2 of Fig. 1.

Like letters refer to like parts throughout both of said views.

In the embodiment of my invention shown in the drawings, I employ a leg strap $a$ which may be composed of fabric webbing, leather, or any other material not having incorporated therein rubber threads or other threads to impart elasticity thereto. The less stretch there is to this material, the more desirable it is for the purposes of my invention, since the absence of excessive stretch, or an elastic substance in the strap, will avoid the necessity for frequent readjustment in its length and prolong the life of the article.

To permit the length of the strap $a$ to be adjusted to the wearer, I provide an ordinary takeup attachment $b$ forming a loop $c$ at one end of the strap.

At $d$ I have shown an ordinary construction of clasp for attachment to half hose adjacent the top thereof.

A suitable connecting mechanism between the clasp $d$ and the strap $a$ is provided, which mechanism is so constructed and combined as to permit the necessary constant variation in the length of the bight formed by the strap $a$ when attaching the garter to the wearer, and utilize the elasticity inherent to half hose for drawing this loop lightly about the leg of the wearer and maintaining a substantially uniform pressure notwithstanding the constant slight variation in the size of this bight.

The connecting means above referred to includes therein a pair of cross levers $e$ and $f$ pivotally connected at $g$ in a manner to permit the free relative movement of these levers. One arm $e'$ of one these levers $e$ has a slot therein at $e^2$ through which one end of the strap $a$ is passed and secured to the strap adjacent the lever, in a manner to permanently connect one end of the strap to said lever. The arm $f'$ of the other lever $f$, and the free end of the strap, are provided with cooperating means by which this free end may be detachably connected to said arm $f'$, this means, in the form of the invention shown, consisting of an opening $f^2$ adapted to receive an ordinary hook having a slot therein through which the portion of the strap $a$ forming the loop $c$, is passed. This construction is that ordinarily employed for permitting adjustment of the leg strap of the garter to the wearer, while permitting adjustment as to the length of the leg strap.

The other arms $e^3$ and $f^3$ of the levers $e$ and $f$ respectively are connected to the clasp $d$ by means of a nonelastic cord or cords $h$, the manner of connecting this cord or cords being immaterial, although in the form of the invention shown, a continuous cord is shown, passing through openings in the clasp and having its opposite ends connected with the lever arms $e^3$ and $f^3$ respectively. A sliding movement of this cord is undesirable and unnecessary.

The levers $e$ and $f$ may be made of highly polished metal, celluloid, or any other suitable substantially rigid material, which will permit the desired scissors action of these levers, or the movement of one of them with relation to the other, or simultaneous movement of both of said levers in relation to each other.

If desired a back plate or washer $i$ may be used to space the lever arms away from the wearer, it being possible to have this plate or washer firmly connected to one of said levers, as $f$, or have it independent of said lever and secured in relation thereto by means of the pivot $g$.

A half hose garter embodying my invention when in use, notwithstanding the absence of any elastic material such as rubber, in any of the parts thereof, will have sufficient flexibility as to the leg strap to automatically adjust itself to the wearer, notwithstanding constant movement of the leg muscles due to change of posture.

In the event of the enlargement of the leg, the strain upon the leg strap $a$ will exert a pull upon the opposite lever arms $e'$ and $f'$ which will cause these arms to separate with a resultant sufficient enlargement in the bight formed in the strap to relieve the pressure upon the leg. A separation of the arms $e'$ and $f'$ will cause a corresponding separation of the arms $e^3$ and $f^3$, thus exerting a slight upward pull through the cord $h$ upon the clasp $b$. The stretch in knitted fabrics will permit this slight upward movement of the clasp, but will develop sufficient elasticity so that when slack is formed in the bight of the strap $a$ as a result of a change of posture of the wearer, there will be a slight downward pull upon the cords $h$ which will result in a reversal in the direction of movement of the levers $e$ and $f$ so as to automatically take up this slack and thus adjust the leg strap to the changed conditions.

The movements of the levers $e$ and $f$ will never be great, but will be sufficient to ensure comfort to the wearer of the garter and avoid any likelihood of the strap $a$ becoming sufficiently loose to afford the desired support to the half hose.

It is not my intention to limit the invention to the precise configuration of the levers $e$ and $f$ as shown in the drawings, nor to the particular form of clasp or leg strap adjusting device, since it is apparent that such may be varied without departing from the spirit and scope of the invention.

Having described the invention, what I claim as new and desire to have protected by Letters Patent, is:—

1. A half hose garter embodying therein a pair of crossed levers, a pivotal connection between said levers, a leg strap, one end of which is connected with one arm of one of said levers, the other end of which is adapted to be connected with the adjacent arm of the other lever, a clasp adapted to be connected with the half hose to be supported, and flexible connections between said clasp and the other arms of said levers respectively, whereby an enlargement in the bight of said leg strap will develop an upward pull upon said clasp, and the slack resulting from a reduction in the size of said bight will be automatically taken up as a result of the downward pull upon said levers by the half hose through said clasp and said flexible connections.

2. A half hose garter embodying therein a pair of crossed levers, a pivotal connection between said levers, a plate carried by said levers and adapted to be interposed between same and the wearer, a leg strap, one end of which is connected with one arm of one of said levers, the other end of which is adapted to be connected with the adjacent arm of the other lever, a clasp adapted to be connected with the half hose to be supported, and flexible connections between said clasp and the other arms of said levers respectively, whereby an enlargement in the bight of said leg strap will develop an upward pull upon said clasp, and the slack resulting from a reduction in the size of said bight will be automatically taken up as a result of the downward pull upon said levers by the half hose through said clasp and said flexible connections.

3. A half hose garter embodying therein a pair of crossed levers, a pivotal connection between said levers, a leg strap, one end of which is connected with one arm of one of said levers, the other end of which is adapted to be connected with the adjacent arm of the other lever, means whereby the length of said leg strap may be adjusted, a clasp adapted to be connected with the half hose to be supported, and flexible connections between said clasp and the other arms of said levers respectively, whereby an enlargement in the bight of said leg strap will develop an upward pull upon said clasp, and the slack resulting from a reduction in the size of said bight will be automatically taken up as a result of the downward pull upon said levers by the half hose through said clasp and said flexible connections.

4. A half hose garter embodying therein a pair of crossed levers, a pivoted connection between said levers, a plate carried by said levers and adapted to be interposed between same and the wearer, a leg strap, one end of which is connected with one arm of one of said levers, the other end of which is adapted to be connected with the adjacent arm of the other lever, means whereby the length of said leg strap may be adjusted, a clasp adapted to be connected with the half hose to be supported, and flexible connections between said clasp and the other arms of said levers respectively, whereby an enlargement in the bight of said leg strap will develop an upward pull upon said clasp, and the slack resulting from a reduction in the size of said bight will be automatically taken up as a result of the downward pull upon said levers by the half hose through said clasp and said flexible connections.

In witness whereof I have hereunto affixed my signature, in the presence of two subscribing witnesses, this 29th day of December, 1923.

FRELEIGH E. BROWNE.

Witnesses:—
 FRIEDA KOEHLER,
 CAROLINE BRANDEL.